United States Patent
Lewis et al.

(10) Patent No.: US 10,077,046 B2
(45) Date of Patent: Sep. 18, 2018

(54) METHOD AND APPARATUS FOR PREVENTING COLLISION WITH TRAILER

(71) Applicant: GM GLOBAL TECHNOLOGY OPERATIONS LLC, Detroit, MI (US)

(72) Inventors: Allan Lewis, Windsor (CA); Caroline Chung, Royal Oak, MI (US); Michael Chaney, Jr., Royal Oak, MI (US); Mohammad Naserian, Windsor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 84 days.

(21) Appl. No.: 15/413,468

(22) Filed: Jan. 24, 2017

(65) Prior Publication Data

US 2018/0208187 A1    Jul. 26, 2018

(51) Int. Cl.
| | |
|---|---|
| B60W 30/09 | (2012.01) |
| E05F 15/40 | (2015.01) |
| G08G 1/16 | (2006.01) |
| B62D 33/027 | (2006.01) |
| B60W 30/095 | (2012.01) |
| B60W 50/14 | (2012.01) |
| G06T 3/00 | (2006.01) |
| G06T 5/20 | (2006.01) |
| G06T 7/13 | (2017.01) |
| G06T 7/70 | (2017.01) |
| B60D 1/36 | (2006.01) |
| B60R 1/00 | (2006.01) |

(52) U.S. Cl.
CPC ............... *B60W 30/09* (2013.01); *B60D 1/36* (2013.01); *B60R 1/003* (2013.01); *B60W 30/0953* (2013.01); *B60W 50/14* (2013.01); *B62D 33/027* (2013.01); *E05F 15/40* (2015.01); *G06T 3/0093* (2013.01); *G06T 5/20* (2013.01); *G06T 7/13* (2017.01); *G06T 7/70* (2017.01); *G08G 1/165* (2013.01); *B60W 2050/146* (2013.01); *B60W 2420/42* (2013.01); *B60W 2520/06* (2013.01); *B60W 2520/28* (2013.01); *B60W 2710/30* (2013.01)

(58) Field of Classification Search
CPC .................................. B60R 1/003; B60D 1/36
See application file for complete search history.

(56) References Cited

U.S. PATENT DOCUMENTS

| | | | |
|---|---|---|---|
| 7,400,971 B2 * | 7/2008 | Robertson | B60J 5/103 340/426.24 |
| 8,410,921 B1 * | 4/2013 | Lewis | B60K 35/00 340/457 |
| 8,907,777 B2 * | 12/2014 | Greer | B60Q 9/00 340/438 |
| 9,061,627 B2 * | 6/2015 | Ariemma | B60Q 9/00 |
| 2013/0076007 A1 * | 3/2013 | Goode | B60D 1/36 280/504 |
| 2017/0259815 A1 * | 9/2017 | Shaker | B60W 30/09 |

* cited by examiner

*Primary Examiner* — Todd M Melton

(57) ABSTRACT

A method and apparatus for preventing a collision with a gate of a vehicle are provided. The method includes: determining whether a hitch in a vehicle bed will be coupling with a trailer; determining whether a gate of the vehicle bed is in a closed position; and performing at least one from among displaying a warning of a potential collision and opening the gate of the vehicle bed, if it is determined that the hitch in the vehicle bed will be coupling with the trailer and the gate of the vehicle bed is in the closed position.

20 Claims, 3 Drawing Sheets

METHOD AND APPARATUS FOR PREVENTING COLLISION WITH TRAILER

INTRODUCTION

Apparatuses and methods consistent with exemplary embodiments relate to detecting potential collisions and outputting alerts. More particularly, apparatuses and methods consistent with exemplary embodiments relate to addressing potential collisions with trailers.

SUMMARY

One or more exemplary embodiments provide a method and an apparatus that detect whether a vehicle will be coupling with a trailer and address a potential collision with the trailer. More particularly, one or more exemplary embodiments provide a method and an apparatus that detect a collision between a gate of a bed of a vehicle that will be coupling with a gooseneck type or fifth wheel type trailer and providing a warning to the driver of the vehicle or lowering the gate of the bed of the vehicle to prevent the collision.

According to an aspect of an exemplary embodiment, a method for preventing a collision with a gate of a vehicle is provided. The method includes: determining whether a hitch in a vehicle bed will be coupling with a trailer; determining whether a gate of the vehicle bed is in a closed position; and performing at least one from among displaying a warning of a potential collision and opening the gate of the vehicle bed, if it is determined that the hitch in the vehicle bed will be coupling with the trailer and the gate of the vehicle bed is in the closed position.

The trailer may be at least one from among a gooseneck type trailer and a fifth wheel type trailer.

The method for preventing the collision with gate of the vehicle may be performed in response to detecting that the vehicle is in a reverse mode and detecting a rearward motion of the vehicle.

The determining whether the hitch in the vehicle bed will be coupling to the trailer may include receiving a user input selecting an option to couple the hitch in the vehicle bed with the trailer.

The determining whether the gate of the vehicle bed is in the closed position may include detecting an electrical signal received from a switch indicating whether the gate of the vehicle bed is in the closed position or in an open position.

The determining whether the hitch in the vehicle bed will be coupling to the trailer may include detecting the trailer to be coupled with the hitch in the vehicle bed by performing an image analysis on an image received from a rear view camera. The rear view camera may also capture the image including a horizontal field of view of the vehicle bed and the hitch in the vehicle bed.

The performing the image analysis on the image received from the rear view camera may include dewarping the image; applying a filter to the image and detecting edges in the image; identifying line targets in the image; identifying an edge of the trailer in the image; and determining a distance between the edge of trailer and a vehicle bed plane.

The determining whether the gate of the vehicle bed is in the closed position may include detecting the closed gate by performing an image analysis on an image received from a rear view camera. The rear view camera may capture the image including a horizontal field of view of the vehicle bed and the hitch in the vehicle bed.

The method may further include determining whether a number of detected wheel speed edges is greater than a predetermined threshold. The performing at least one from among the displaying the warning of the potential collision and the opening the tailgate may be performed if the number of detected wheel speed edges is greater than the predetermined threshold.

According to an aspect of another exemplary embodiment, an apparatus for preventing a collision with a gate of a vehicle is provided. The apparatus includes: at least one memory comprising computer executable instructions; and at least one processor configured to read and execute the computer executable instructions. The computer executable instructions causing the at least one processor to: determine whether a hitch in a vehicle bed will be coupling with a trailer; determine whether a gate of the vehicle bed is in a closed position; and perform at least one from among displaying a warning of a potential collision and opening the gate of the vehicle bed, if it is determined that the hitch in the vehicle bed will be coupling with the trailer and the gate of the vehicle bed is in the closed position.

The trailer may be at least one from among a gooseneck type trailer and a fifth wheel type trailer.

The computer executable instructions may cause the at least one processor to detect that whether the vehicle is in a reverse mode and to detect a rearward motion of the vehicle. The determining whether a hitch in a vehicle bed will be coupling with a trailer and whether a gate of the vehicle bed is in a closed position may be performed in response to determining that the vehicle is in a reverse mode and detecting a rearward motion of the vehicle.

The computer executable instructions may cause the at least one processor to determine whether the hitch in the vehicle bed will be coupling to the trailer by receiving a user input selecting an option to couple the hitch in the vehicle bed with the trailer.

The computer executable instructions may cause the at least one processor to determine whether the gate of the vehicle bed is in the closed position by detecting an electrical signal received from a switch indicating whether the gate of the vehicle bed is in the closed position or in an open position.

The computer executable instructions may cause the at least one processor to determine whether the hitch in the vehicle bed will be coupling to the trailer and detect the trailer to be coupled with the hitch in the vehicle bed by performing an image analysis on an image received from a rear view camera.

The rear view camera may capture the image including a horizontal field of view of the vehicle bed and the hitch in the vehicle bed.

The computer executable instructions may cause the at least one processor to perform the image analysis on the image received from the rear view camera by: dewarping the image; applying a filter to the image and detecting edges in the image; identifying line targets in the image; identifying an edge of the trailer in the image; and determining a distance between the edge of trailer and vehicle bed plane.

The computer executable instructions may cause the at least one processor to determine whether the gate of the vehicle bed is in the closed position and detect the closed gate by performing an image analysis on an image received from a rear view camera. The rear view camera may capture the image including a horizontal field of view of the vehicle bed and the hitch in the vehicle bed.

The computer executable instructions may cause the at least one processor to determine whether a number of detected wheel speed edges is greater than a predetermined threshold.

The at least one processor may perform the at least one from among the displaying the warning of the potential collision and the opening the tailgate is performed if the number of detected wheel speed edges is greater than the predetermined threshold.

According to an aspect of another exemplary embodiment, a non-transitory computer readable medium comprising computer executable instructions executable by a processor to perform a method for preventing a collision with a gate of a vehicle. The method includes: determining whether a hitch in a vehicle bed will be coupling with a trailer; determining whether a gate of the vehicle bed is in a closed position; and performing at least one from among displaying a warning of a potential collision and opening the gate of the vehicle bed, if it is determined that the hitch in the vehicle bed will be coupling with the trailer and the gate of the vehicle bed is in the closed position.

Other objects, advantages and novel features of the exemplary embodiments will become more apparent from the following detailed description of exemplary embodiments and the accompanying drawings.

DETAILED DESCRIPTION OF EXEMPLARY EMBODIMENTS

Figure 1:
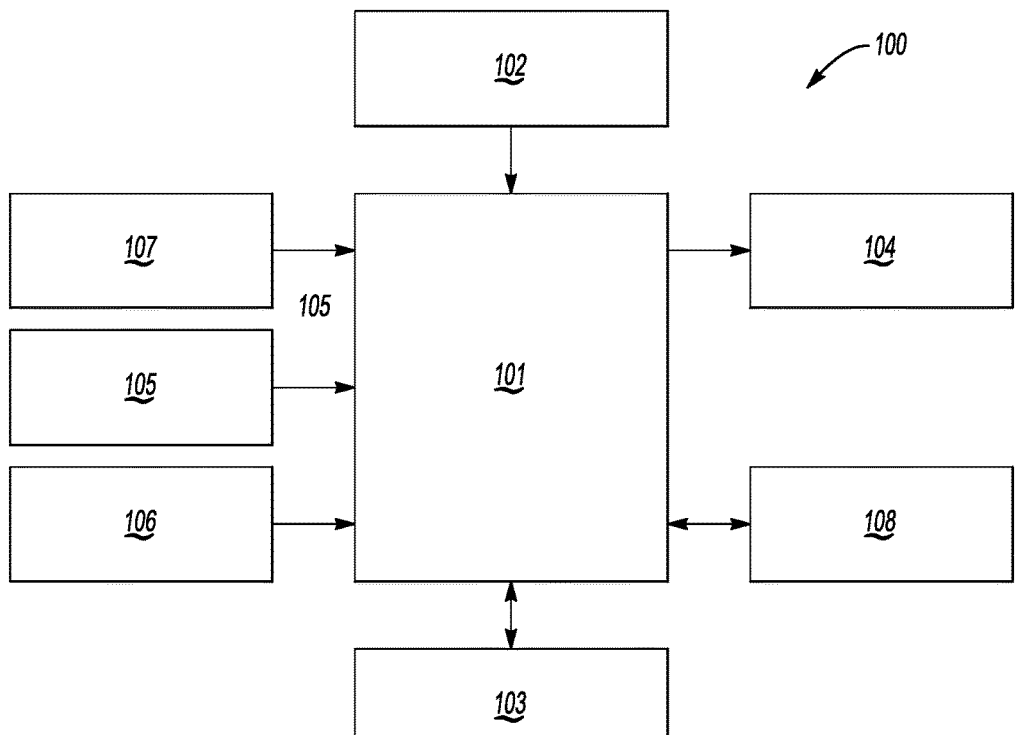
FIG. 1 shows a block diagram of an apparatus that prevents a collision with a gate of a vehicle according to an exemplary embodiment.

An apparatus and method that assist in preventing a collision with a gate of a vehicle will now be described in detail with reference to FIGS. 1-5 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or into one or more devices. In addition, individual elements may be provided on separate devices.

Vehicles such as trucks include trailer hitches that serve as attachment points for trailers that may be towed by a vehicle. Trailer hitches may include a fifth-wheel kingpin or gooseneck type hitch. The fifth-wheel kingpin or gooseneck type hitches may be located in a bed of a vehicle or truck. The bed may have a gate or tailgate that may block access to the fifth-wheel kingpin or gooseneck type hitch when the gate is closed. Thus, there is a potential for collision between the gate or tailgate of a vehicle bed and a fifth-wheel kingpin or gooseneck when an operator of the vehicle is attempting to hitch a trailer to a hitch located in the vehicle bed.

To address the above issue, operators of a vehicle may manually check whether a gate of a vehicle is open and open the gate manually if it is closed. However, this process requires the driver to exit the vehicle. Often times, an operator of the vehicle may forget to check whether the gate of the vehicle is open. Moreover, vehicles now include sensors and cameras that allow for providing obstacle detection and visual assistance for navigating obstacles. As such, one or more sensors may be used to detect whether a gate of a vehicle bed is open or closed and to detect whether a vehicle operator intends to hitch fifth-wheel kingpin or gooseneck type trailer to a trailer hitch in a bed.

FIG. 1 shows a block diagram of an apparatus that prevents a collision with a gate of a vehicle 100 according to an exemplary embodiment. As shown in FIG. 1, the apparatus that prevents a collision with a gate of a vehicle 100, according to an exemplary embodiment, includes a controller 101, a power supply 102, a storage 103, an output 104, a vehicle gate detection sensor 105, a user input 106, a trailer detection sensor 107, and a communication device 108. However, the apparatus that prevents a collision with a gate of a vehicle 100 is not limited to the aforementioned configuration and may be configured to include additional elements and/or omit one or more of the aforementioned elements. The apparatus that prevents a collision with a gate of a vehicle 100 may be implemented as part of a vehicle, as a standalone component, as a hybrid between an on vehicle and off vehicle device, or in another computing device.

The controller 101 controls the overall operation and function of the apparatus that prevents a collision with a gate of a vehicle 100. The controller 101 may control one or more of a storage 103, an output 104, a vehicle gate detection sensor 105, a user input 106, a trailer detection sensor 107, and a communication device 108 of the apparatus that prevents a collision with a gate of a vehicle 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the storage 103, the output 104, the vehicle gate detection sensor 105, the user input 106, the trailer detection sensor 107, and the communication device 108 of the apparatus that prevents a collision with a gate of a vehicle 100. The information may be sent and received via a bus or network, or may be directly read or written to/from one or more of the storage 103, the output 104, the user input 106, the trailer detection sensor 107, and the communication device 108 of the apparatus that prevents a collision with a gate of a vehicle 100. Examples of suitable network connections include a controller area network (CAN), a media oriented system transfer (MOST), a local interconnection network (LIN), a local area network (LAN), wireless networks such as Bluetooth and 802.11, and other appropriate connections such as Ethernet.

The power supply 102 provides power to one or more of the controller 101, the storage 103, the output 104, the vehicle gate detection sensor 105, the user input 106, the trailer detection sensor 107, and the communication device 108, of the apparatus that prevents a collision with a gate of a vehicle 100. The power supply 102 may include one or more from among a battery, an outlet, a capacitor, a solar energy cell, a generator, a wind energy device, an alternator, etc.

The storage 103 is configured for storing information and retrieving information used by the apparatus that prevents a collision with a gate of a vehicle 100. The storage 103 may be controlled by the controller 101 to store and retrieve information received from the trailer detection sensor 107 or the vehicle gate detection sensor 105. The information may include information on a trailer detected by the trailer detection sensor 107 and/or information on whether a vehicle gate is open or closed. In addition, the storage may store image information provided by trailer detection sensor 107 that is analyzed to determine whether a vehicle is attempting to hitch a gooseneck type or fifth wheel type trailer. The storage 103 may also include the computer instructions configured to be executed by a processor to perform the functions of the apparatus that prevents a collision with a gate of a vehicle 100.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 outputs information in one or more forms including: visual, audible and/or haptic form. The output 104 may be controlled by the controller 101 to provide outputs to the user of the apparatus that prevents a collision with a gate of a vehicle 100. The output 104 may include one or more from among a speaker, audio, a display, a centrally-located display, a head up display, a windshield display, a haptic feedback device, a vibration device, a tactile feedback device, a tap-feedback device, a holographic display, an instrument light, an indicator light, etc.

The output 104 may output notification including one or more from among an audible notification, a light notification, and a display notification. The notification may include information notifying of a potential collision with a trailer. In addition, the output 104 may output an image from the rear of a vehicle showing the bed of the vehicle and a trailer to which the vehicle is attempting to hitch.

The vehicle gate detection sensor 105 may detect whether a gate of the vehicle bed is open or closed. The vehicle gate detection sensor 105 may be a camera or imaging sensor that provides image information to be analyzed to determine whether a gate of a vehicle is open. In addition, the vehicle gate detection sensor 105 and trailer detection sensor 107 may combined into one camera or imaging sensor that provides image information to be analyzed to determine whether a gate of a vehicle is open and whether the vehicle is attempting to hitch to a trailer. According to another example, the vehicle gate detection sensor may be a switch or other device that provides a signal or information indicating whether a gate of a vehicle is open or closed.

The user input 106 is configured to provide information and commands to the apparatus that prevents a collision with a gate of a vehicle 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a touchpad, etc. The user input 106 may be configured to receive a user input to acknowledge or dismiss the notification output by the output 104. The user input 106 may also be configured to receive a user input to activate a trailer detection algorithm or the apparatus that prevents a collision with a gate of a vehicle 10. For example, the setting to turn the system on or off may be selected by an operator via user input 106.

The trailer detection sensor 107 may include one or more from among a plurality of sensors including a camera, a laser sensor, an ultrasonic sensor, an infrared camera, a LIDAR, a radar sensor, an ultra-short range radar sensor, an ultra-wideband radar sensor, and a microwave sensor. The trailer detection sensor 107 may provide one or more images from a rear-facing camera that may be analyzed to determine whether an operator of a vehicle intends to couple a hitch on a bed of the vehicle with a trailer. In addition, other types of information such as distance, infrared images, speed, velocity, acceleration, direction of travel, etc., from other types of sensors may be provided. The information may be processed to determine whether an operator of a vehicle intends to couple a hitch on a bed of the vehicle with a trailer, determine a type of trailer, determine whether a gate of a bed of a vehicle is open, and determine whether collision between a gate of a bed of the vehicle and a trailer may occur.

The communication device 108 may be used by apparatus that prevents a collision with a gate of a vehicle 100 to communicate with various types of external apparatuses according to various communication methods. The communication device 108 may be used to send/receive information on a trailer and/or information on whether a vehicle gate is open or closed to/from the controller 101 of the apparatus that prevents a collision with a gate of a vehicle 100.

The communication device 108 may include various communication modules such as one or more from among a telematics unit, a broadcast receiving module, a near field communication (NFC) module, a GPS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from a GPS satellite and detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, WI-Fi or IEEE communication protocol and communicates with the external network. The wireless communication module may further include a mobile communication module that accesses a mobile communication network and performs communication according to various mobile communication standards such as 3rd generation (3G), $3^{rd}$ generation partnership project (3GPP), long-term evolution (LTE), Bluetooth, EVDO, CDMA, GPRS, EDGE or ZigBee.

According to another exemplary embodiment, the controller 101 of the apparatus that prevents a collision with a gate of a vehicle 100 may be configured to determine whether a hitch in a vehicle bed will be coupling with a trailer; determine whether a gate of the vehicle bed is in a closed position; and perform at least one from among displaying a warning of a potential collision and opening the gate of the vehicle bed, if it is determined that the hitch in the vehicle bed will be coupling with the trailer and the gate of the vehicle bed is in the closed position.

The controller 101 of the apparatus that prevents a collision with a gate of a vehicle 100 may be configured to determine whether the hitch in the vehicle bed will be coupling to the trailer and to detect the trailer being coupled with the hitch in the vehicle bed by performing an image analysis on an image received from a rear view camera. The rear view camera may capture the image including a horizontal field of view of the vehicle bed and the hitch in the vehicle bed. The controller 101 may perform the aforementioned process in response to detecting that a vehicle is in a reverse mode or gear, and/or detecting rearward motion of the vehicle based on information from speed sensors, wheel speed sensors, motion sensors, GPS, etc.

The controller 101 of the apparatus that prevents a collision with a gate of a vehicle 100 may be configured to determine whether the hitch in the vehicle bed will be coupling to the trailer by receiving a user input selecting an option to couple the hitch in the vehicle bed with the trailer. In addition, the controller 101 of the apparatus that prevents a collision with a gate of a vehicle 100 may be configured to determine whether the gate of the vehicle bed is in the closed position by detecting an electrical signal received from a switch indicating whether the gate of the vehicle bed is in the closed position or in an open position.

The controller 101 of the apparatus that prevents a collision with a gate of a vehicle 100 may be configured to determine whether the gate of the vehicle bed is in the closed position by detecting the closed gate by performing an image analysis on an image received from a rear view camera. The rear view camera may capture the image including a horizontal field of view of the vehicle bed and the hitch in the vehicle bed.

The controller 101 of the apparatus that prevents a collision with a gate of a vehicle 100 may be configured to determine whether a number of detected wheel speed edges is greater than a predetermined threshold. The controller may further control perform the displaying the warning of the potential collision or the opening the tailgate is performed if the number of detected wheel speed edges is greater than the predetermined threshold.

The controller 101 may also be configured to perform the image analysis on the image received from the rear view camera by dewarping the image, applying a filter to the image and detecting edges in the image, identifying line targets in the image, identifying and edge of the trailer in the image and determining a distance between the edge of trailer and vehicle bed plane.

Figure 2:
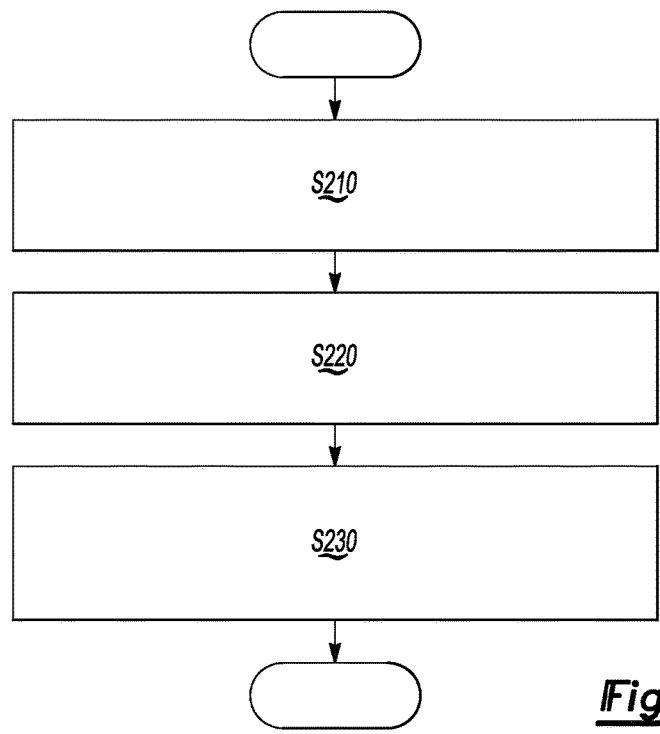
FIG. 2 shows a flowchart for a method of preventing a collision with a gate of a vehicle according to an exemplary embodiment.

FIG. 2 shows a flowchart for a method for detecting a hazardous vehicle according to an exemplary embodiment. The method of FIG. 2 may be performed by the apparatus that prevents a collision with a gate of a vehicle 100 or may be encoded into a computer readable medium as instructions that are executable by a computer to perform the method.

Referring to FIG. 2, it is determined whether a hitch in the vehicle bed will be coupling with a trailer in operation S210. It is then determined whether the gate of the vehicle bed is in the closed or the open position in operation S220. In operation S230, a warning of a potential collision is displayed on a display in a vehicle or the tailgate of vehicle bed is opened, if it is determined that the hitch in the vehicle bed will be coupling with the trailer and the gate of vehicle bed is closed.

Figure 3:
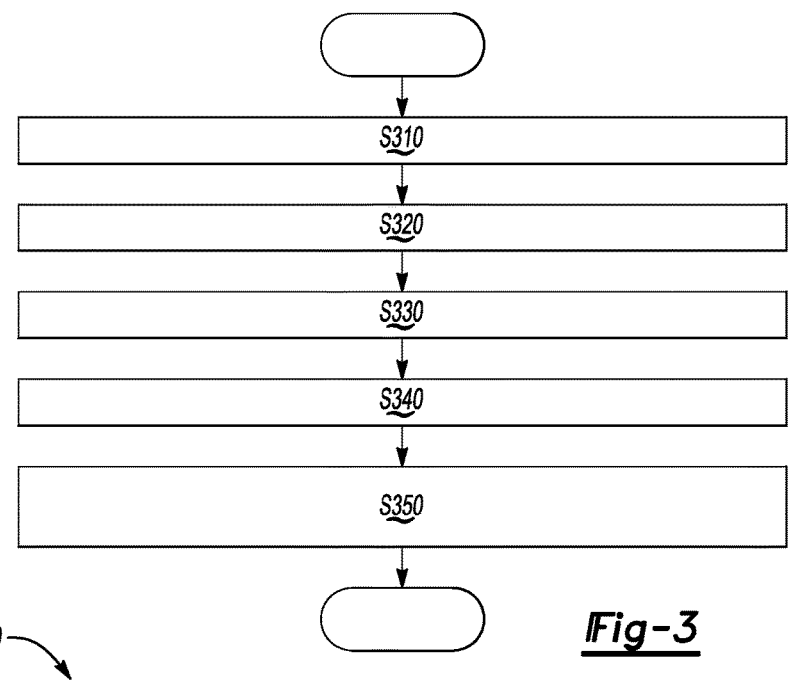
FIG. 3 shows a flowchart for performing image analysis according to an aspect of an exemplary embodiment.

FIG. 3 shows a flowchart for performing image analysis according to an aspect of an exemplary embodiment. The method of FIG. 3 may be performed by the apparatus that prevents a collision with a gate of a vehicle 100 or may be encoded into a computer readable medium as instructions that are executable by a computer to perform the method.

Referring to FIG. 3, an image is dewarped in operation S310. For example, the image may be received from the trailer detection sensor 107. In operation S320, a filter is applied to the image and the edges are detected. The edges may indicate the potential points of collision input indicating whether to contact authorities is received from the device.

In operation S330, line targets are identified in the image followed by the edges of the trailer in operation S340. Then, a distance is determined between the edge of the trailer and the vehicle bed plane or the gate of the vehicle bed in operation S350. This distance is illustrated in element 404 of FIG. 4.

Figure 4:
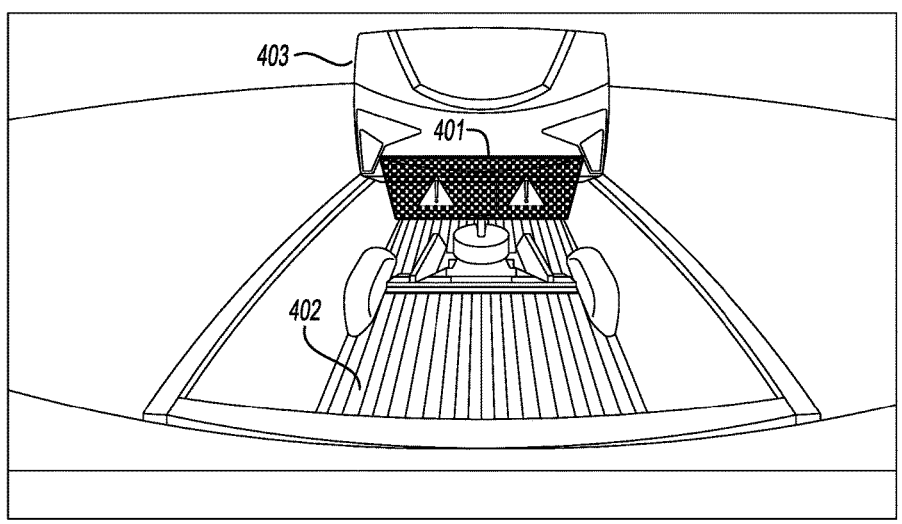
FIG. 4 shows an illustration of a warning that a gate of a vehicle bed may collide with a trailer according to an aspect of an exemplary embodiment.
Figure 4:
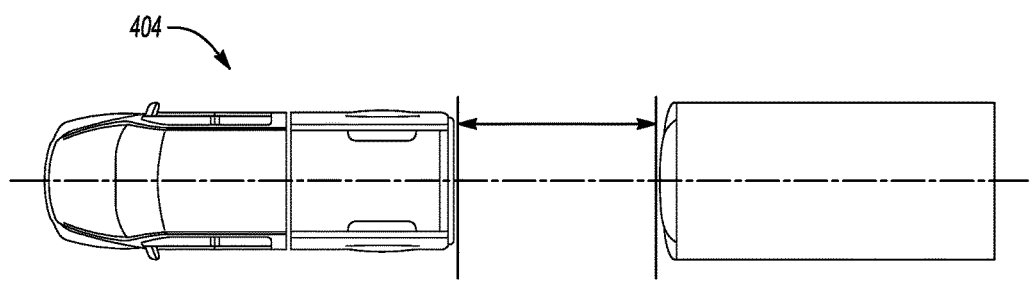

FIG. 4 shows an illustration of a warning that a gate of a vehicle bed may collide with a trailer to an aspect of an exemplary embodiment. Referring to FIG. 4, a display shows an image 400 produced by a rear facing camera. The image shows a vehicle bed 402 and a trailer 403. The trailer 403 may be a gooseneck type or fifth wheel type trailer. After the apparatus that prevents a collision with a gate of a vehicle 100 detects a potential collision with a trailer, a warning indicator 401 or highlighting of the gate of the vehicle bed may be displayed to alert an operator of the potential collision. The warning indicator 401 is just one example of a warning and other warnings or notifications may be provided such as audible warnings, haptic feedback, and other displayed warnings.

In addition, illustration 404 shows the distance between the trailer and vehicle bed that is determined and compared to a threshold distance to determine whether an operator of a vehicle intends to couple a trailer to a hitch on a bed of the vehicle and whether a potential collision may occur if the gate of the vehicle is closed when the operator of a vehicle intends to couple a trailer to a hitch on the bed of a vehicle.

Figure 5:
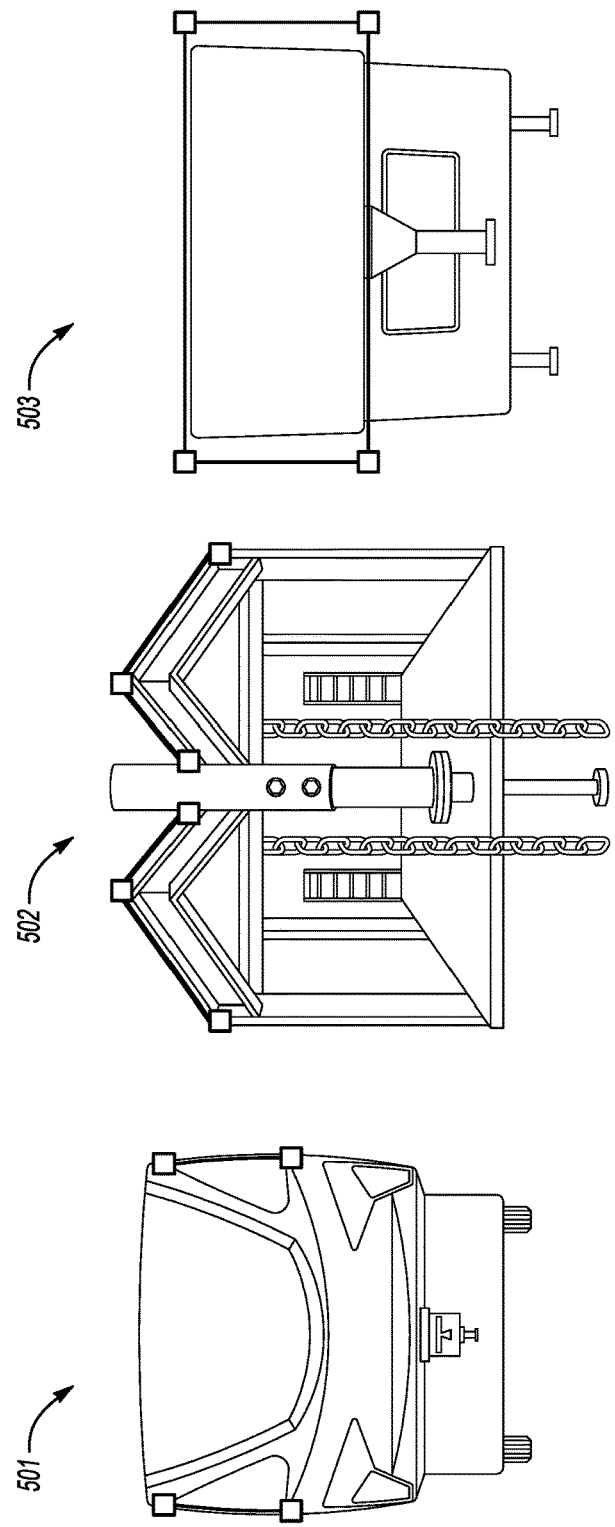
FIG. 5 shows illustrations of various types of trailers according to an aspect of an exemplary embodiment.

FIG. 5 shows an illustration of various types of trailers according to an aspect of an exemplary embodiment. Referring to FIG. 5, collisions with various types of trailers may be detected by the apparatus that prevents a collision with a gate of a vehicle. For example, a fifth wheel type trailer 501 may be coupling with a hitch in the vehicle bed and may potentially collide with a closed vehicle gate. Moreover, a first gooseneck type trailer 502 and a second gooseneck type trailer 503 may be coupling with a hitch in the vehicle bed and may potentially collide with a closed vehicle gate.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method for preventing a collision with a gate of a vehicle, the method comprising:
   determining whether a hitch in a vehicle bed will be coupling with a trailer;
   determining whether a gate of the vehicle bed is in a closed position; and
   performing at least one from among displaying a warning of a potential collision and opening the gate of the vehicle bed, if it is determined that the hitch in the vehicle bed will be coupling with the trailer and the gate of the vehicle bed is in the closed position.

2. The method of claim 1, wherein the trailer is at least one from among a gooseneck type trailer and a fifth wheel type trailer.

3. The method of claim 1, wherein the method for preventing the collision with gate of the vehicle is performed in response to detecting that the vehicle is in a reverse mode and detecting a rearward motion of the vehicle.

4. The method of claim 1, wherein the determining whether the hitch in the vehicle bed will be coupling to the trailer comprises receiving a user input selecting an option to couple the hitch in the vehicle bed with the trailer.

5. The method of claim 1, wherein the determining whether the gate of the vehicle bed is in the closed position comprises detecting an electrical signal received from a switch indicating whether the gate of the vehicle bed is in the closed position or in an open position.

6. The method of claim 1, wherein the determining whether the hitch in the vehicle bed will be coupling to the trailer comprises detecting the trailer to be coupled with the hitch in the vehicle bed by performing an image analysis on an image received from a rear view camera, and
   wherein the rear view camera captures the image including a horizontal field of view of the vehicle bed and the hitch in the vehicle bed.

7. The method of claim 6, wherein the performing the image analysis on the image received from the rear view camera comprises:
   dewarping the image;
   applying a filter to the image and detecting edges in the image;
   identifying line targets in the image;
   identifying an edge of the trailer in the image; and
   determining a distance between the edge of the trailer and a vehicle bed plane.

8. The method of claim 1, wherein the determining whether the gate of the vehicle bed is in the closed position comprises detecting the closed gate by performing an image analysis on an image received from a rear view camera, and
   wherein the rear view camera captures the image including a horizontal field of view of the vehicle bed and the hitch in the vehicle bed.

9. The method of claim 1, further comprising:
   determining whether a number of detected wheel speed edges is greater than a predetermined threshold,
   wherein the performing at least one from among the displaying the warning of the potential collision and the opening the tailgate is performed if the number of detected wheel speed edges is greater than the predetermined threshold.

10. An apparatus for preventing a collision with a gate of a vehicle, the apparatus comprising:
    at least one memory comprising computer executable instructions; and
    at least one processor configured to read and execute the computer executable instructions, the computer executable instructions causing the at least one processor to:
    determine whether a hitch in a vehicle bed will be coupling with a trailer;
    determine whether a gate of the vehicle bed is in a closed position; and
    perform at least one from among displaying a warning of a potential collision and opening the gate of the vehicle bed, if it is determined that the hitch in the vehicle bed will be coupling with the trailer and the gate of the vehicle bed is in the closed position.

11. The apparatus of claim 10, wherein the trailer is at least one from among a gooseneck type trailer and a fifth wheel type trailer.

12. The apparatus of claim 10, wherein the computer executable instructions cause the at least one processor to detect that whether the vehicle is in a reverse mode and to detect a rearward motion of the vehicle.

13. The apparatus of claim 10, wherein the computer executable instructions cause the at least one processor to determine whether the hitch in the vehicle bed will be coupling to the trailer by receiving a user input selecting an option to couple the hitch in the vehicle bed with the trailer.

14. The apparatus of claim 10, wherein the computer executable instructions cause the at least one processor to determine whether the gate of the vehicle bed is in the closed position by detecting an electrical signal received from a switch indicating whether the gate of the vehicle bed is in the closed position or in an open position.

15. The apparatus of claim 10, wherein the computer executable instructions cause the at least one processor to determine whether the hitch in the vehicle bed will be coupling to the trailer and detect the trailer to be coupled with the hitch in the vehicle bed by performing an image analysis on an image received from a rear view camera.

16. The apparatus of claim 15, wherein the rear view camera captures the image including a horizontal field of view of the vehicle bed and the hitch in the vehicle bed.

17. The apparatus of claim 16, wherein the computer executable instructions cause the at least one processor to perform the image analysis on the image received from the rear view camera by:
- dewarping the image;
- applying a filter to the image and detecting edges in the image;
- identifying line targets in the image;
- identifying an edge of the trailer in the image; and
- determining a distance between the edge of the trailer and a vehicle bed plane.

18. The apparatus of claim 10, wherein the computer executable instructions cause the at least one processor to determine whether the gate of the vehicle bed is in the closed position by detecting the closed gate by performing an image analysis on an image received from a rear view camera, and
- wherein the rear view camera captures the image including a horizontal field of view of the vehicle bed and the hitch in the vehicle bed.

19. The apparatus of claim 10, wherein the computer executable instructions cause the at least one processor to determine whether a number of detected wheel speed edges is greater than a predetermined threshold,
- wherein the at least one processor performs the at least one from among the displaying the warning of the potential collision and the opening the tailgate is performed if the number of detected wheel speed edges is greater than the predetermined threshold.

20. A non-transitory computer readable medium comprising computer executable instructions executable by a processor to perform a method for preventing a collision with a gate of a vehicle comprising:
- determining whether a hitch in a vehicle bed will be coupling with a trailer;
- determining whether a gate of the vehicle bed is in a closed position; and
- performing at least one from among displaying a warning of a potential collision and opening the gate of the vehicle bed, if it is determined that the hitch in the vehicle bed will be coupling with the trailer and the gate of the vehicle bed is in the closed position.

* * * * *